United States Patent
Kodama

(10) Patent No.: US 10,534,354 B2
(45) Date of Patent: Jan. 14, 2020

(54) DEVICE MAINTENANCE APPARATUS, DEVICE MAINTENANCE SYSTEM, DEVICE MAINTENANCE METHOD, DEVICE MAINTENANCE PROGRAM, AND STORAGE MEDIUM

(71) Applicant: Yokogawa Electric Corporation, Tokyo (JP)

(72) Inventor: Kazutoshi Kodama, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 282 days.

(21) Appl. No.: 15/629,840

(22) Filed: Jun. 22, 2017

(65) Prior Publication Data

US 2017/0371325 A1  Dec. 28, 2017

(30) Foreign Application Priority Data

Jun. 24, 2016  (JP) .................................. 2016-126004

(51) Int. Cl.
*G06F 13/00* (2006.01)
*G05B 19/418* (2006.01)

(52) U.S. Cl.
CPC . *G05B 19/41875* (2013.01); *G05B 19/41855* (2013.01); *G05B 2219/24019* (2013.01)

(58) Field of Classification Search
CPC .............................................. G05B 19/41875
See application file for complete search history.

(56) References Cited

U.S. PATENT DOCUMENTS

| 2010/0145476 A1 | 6/2010 | Junk et al. |
| 2011/0238190 A1 | 9/2011 | Okamoto |
| 2012/0036568 A1 | 2/2012 | Kodama |
| 2015/0066162 A1* | 3/2015 | Hokeness .......... G05B 19/0426 700/28 |
| 2016/0100437 A1 | 4/2016 | Armstrong et al. |
| 2016/0110304 A1 | 4/2016 | Mori et al. |

FOREIGN PATENT DOCUMENTS

| JP | 2012-38145 A | 2/2012 |
| JP | 5629627 B2 | 11/2014 |
| JP | 2016-76927 A | 5/2016 |
| JP | 2016-081415 A | 5/2016 |

* cited by examiner

*Primary Examiner* — Phuong Huynh
(74) *Attorney, Agent, or Firm* — Sughrue Mion, PLLC

(57) ABSTRACT

A device maintenance apparatus, includes: a communication control part configured to control a communication with a device; a device information acquisition part configured to acquire device information of the device via the communication; a storage configured to store maintenance process information, the maintenance process information including device specifying information for specifying a maintenance target device and process specifying information for specifying details of a maintenance process; and an information processing part configured to compare the acquired device information to the stored maintenance process information, and to execute a maintenance process on the device based on the result of the comparison.

17 Claims, 10 Drawing Sheets

FIG. 5

| 1001 | 1002 | 1003 | 1004 | 1005 | 1006 | 1007 | 1008 | 1009 | 1010 | 1011 | 1012 | 1013 | |
|---|---|---|---|---|---|---|---|---|---|---|---|---|---|
| Device Tag | Device Type | Manufacture ID | Unit | Slot | Channel | Device ID | Protocol | Device Tag | Descriptor | LRV | URV | Pressure Unit | ... |
| C | C | C | C | C | C | D | | D | D | D | D | D | ... |
| A123 | EJX | Yokogawa | 1 | 1 | 1 | 37519F423F | HART | A456 | AAA | 0 | 100 | Pa | ... |
| B123 | EJX | Yokogawa | 1 | 1 | 2 | 375135ABC | HART | B456 | BBB | 0 | 100 | Pa | |
| C123 | EJX | Yokogawa | 3 | 1 | 1 | 5945431234 | FF | C456 | CCC | 0 | 50 | Pa | |
| D123 | YTA | Yokogawa | 4 | 1 | 5 | 5945435678 | FF | D456 | DDD | 0 | 50 | degC | |
| E123 | YTA | Yokogawa | 5 | 1 | 6 | 375135DEF | HART | E456 | EEE | 0 | 50 | K | ... |
| F123 | EJA | Yokogawa | 5 | 2 | 7 | 1234ABCD | PROFIBUS | F456 | FFF | 0 | 100 | kPa | ... |
| ... | | | | | | | | | | | | | |

| Enable Commissioning | Device Tag | Device Type | Manufacture ID | Unit | Slot | Channel | ... |
|---|---|---|---|---|---|---|---|
| | C | | | C | C | C | |
| TRUE | A123 | EJX | Yokogawa | 1 | 1 | 1 | |
| TRUE | B123 | EJX | Yokogawa | 1 | 1 | 2 | |
| TRUE | C123 | EJX | Yokogawa | 3 | 1 | 1 | |
| FALSE | D123 | YTA | Yokogawa | 4 | 1 | 5 | |
| FALSE | E123 | YTA | Yokogawa | 5 | 1 | 6 | |
| TRUE | F123 | EJA | Yokogawa | 5 | 2 | 7 | |
| ⋮ | | | | | | | ... |

| IO Module Type | Device Tag | Device Type | Manufacture ID | Unit | Slot | Channel | ... |
|---|---|---|---|---|---|---|---|
| | C | | | C | C | C | |
| XXXX | A123 | EJX | Yokogawa | 1 | 1 | 1 | |
| XXXX | B123 | EJX | Yokogawa | 1 | 1 | 2 | |
| XXXX | C123 | EJX | Yokogawa | 3 | 1 | 1 | |
| YYYY | D123 | YTA | Yokogawa | 4 | 1 | 5 | |
| YYYY | E123 | YTA | Yokogawa | 5 | 1 | 6 | |
| ZZZZ | F123 | EJA | Yokogawa | 5 | 2 | 7 | |
| ⋮ | | | | | | | ... |

```
┌─E-mail notification setting──────────────────┐
│                                              │
│   E-mail        aaa@bbb.com                  │
│                                              │
│   ☑  Notify when download completes          │
│                                              │
│   ☑  Notify when error occurs                │
│                                              │
│   ☐  Notify when Non-existent occurs         │
│                                              │
└──────────────────────────────────────────────┘
```

FIG. 12

```
┌──────────────────────────────────────────┐
│                                          │
│   SPECIFY RANGE OF MASTER DEVICE         │
│                                          │
│   Channel   [ 1 ] ~ [ 2 ]                │
│                                          │
│   SPECIFY RANGE OF COMMISSIONING DEVICE  │
│                                          │
│   Channel   [ 3 ] ~ [ 4 ]                │
│                                          │
└──────────────────────────────────────────┘
```

DEVICE MAINTENANCE APPARATUS, DEVICE MAINTENANCE SYSTEM, DEVICE MAINTENANCE METHOD, DEVICE MAINTENANCE PROGRAM, AND STORAGE MEDIUM

BACKGROUND OF THE INVENTION

Field of the Invention

The present invention relates to a device maintenance apparatus, a device maintenance system, a device maintenance method, a device maintenance program, and a storage medium.

Priority is claimed on Japanese Patent Application No. 2016-126004, filed on Jun. 24, 2016, the contents of which are incorporated herein by reference.

Description of Related Art

In a plant, a factory, or the like (hereinafter, collectively referred to as a "plant"), for example, an industrial plant such as a chemical industrial plant, a plant for managing and controlling a wellhead such as a gas field and oil field and its surroundings, a plant for managing and controlling an electrical power generation such as water power, fire power, and nuclear power, a plant for managing and controlling an energy harvesting such as photovoltaic power generation and wind-power generation, and a plant for managing and controlling a water and sewerage, and a dam, a distributed control system (DCS) in which on-site devices such as measures and actuators, which are referred to as field devices, are connected via a communication means to controllers, which control the field devices, has been implemented to realize a high level of automated operation. In the plant in which such a distributed control system is implemented, the maintenance for the field devices (hereinafter, also simplified and referred to as "devices") is regularly or irregularly performed by workers in order to prevent abnormal operation, maintain measurement accuracy, and the like.

The maintenance of the field devices is performed using a device maintenance apparatus capable of performing wire communication or wireless communication with the field devices. The device maintenance apparatus includes, for example, a laptop computer, a tablet computer, a PDA (Personal Digital Assistant), and a smartphone, each of which a program provided for maintaining the field devices is installed into. Every field device can retain one or a plurality of pieces of device information. The device information refers to information relating to the field device and includes, for example, information for setting an operation of the field device, information indicating a state of the field device, or identification information of the field device.

A device maintenance apparatus is connected to a field device to intercommunicate therewith, and can execute a maintenance process with respect to device information of the field device (hereinafter referred to as a "maintenance process"). The maintenance process includes, for example, a process of reading and checking device information set for the field device, a process of setting new device information for the field device, a process of adjusting or changing the device information set for the field device, and a process of setting the device information for the field device and causing it to execute a predetermined operation.

Field devices and a control apparatus that controls the field devices are connected to each other via an input/output (I/O) module. The I/O module has an interface for the control apparatus and an interface for the field devices. The I/O module can connect a plurality of field devices to the interface for the field devices. Accordingly, the control apparatus can communicate with the plurality of field devices via the I/O module. In addition, the I/O module has an interface for the device maintenance apparatus. Since the I/O module has the interface for the device maintenance apparatus and the interface for the field devices, the device maintenance apparatus can communicate with the plurality of field devices via the I/O module and can execute a maintenance process on the plurality of field devices (for example, Japanese Unexamined Patent Application, First Publication No. 2016-81415). Furthermore, there is a method of setting a parameter input into a prepared template for the field devices (for example, US Patent Application, Publication No. 2015/0066162).

However, since the device maintenance apparatus individually executes the maintenance process on the field devices, an operator may perform operations for executing the maintenance process on each of the field devices even when the plurality of field devices are connected to the I/O module. When a plant is constructed, for example, maintenance processes of setting device information on many field devices or performing adjusting processes on the field devices are performed at a time, and thus it may be necessary for an operator to invest a long work time in device processing using a device maintenance apparatus. For example, when there are 100 field devices on which 10 kinds of maintenance processes are to be performed in a plant, an operator may have to operate a device maintenance apparatus 100×10=1,000 times.

In addition, if the number of operations increases, a human error such as an input mistake made by an operator may occur.

Furthermore, when parameters input to templates are set for field devices, it is necessary for an operator to check a correspondence between the templates and the field devices, which may lower work efficiency.

SUMMARY OF THE INVENTION

The present invention provides a device maintenance apparatus, a device maintenance system, a device maintenance method, a device maintenance program, and a storage medium which can improve work efficiency and reduce human errors in device processing.

A device maintenance apparatus may include: a communication control part configured to control a communication with a device; a device information acquisition part configured to acquire device information of the device via the communication; a storage configured to store maintenance process information, the maintenance process information including device specifying information for specifying a maintenance target device and process specifying information for specifying details of a maintenance process; and an information processing part configured to compare the acquired device information to the stored maintenance process information, and to execute a maintenance process on the device based on the result of the comparison.

The maintenance process information may include the device specifying information and the process specifying information that are capable of being set beforehand.

The device information acquisition part may acquire the device information of the device within a communication range that is capable of being set beforehand.

The device information acquisition part may acquire the device information of the device with respect to a target that is capable of being set beforehand.

The information processing part may execute the maintenance process on the device in a communication specification that is capable of being set beforehand.

When the result of the executed maintenance process satisfies a condition that is set beforehand, the information processing part may execute a notification process based on a notification method that is set beforehand.

A device maintenance system may include: a device maintenance apparatus and an input/output part. The device maintenance apparatus may include: a communication control part configured to control a communication with a device; a device information acquisition part configured to acquire device information of the device via the communication; a storage configured to store maintenance process information, the maintenance process information including device specifying information for specifying a maintenance target device and process specifying information for specifying details of a maintenance process; and an information processing part configured to compare the acquired device information to the stored maintenance process information, and to execute a maintenance process on the device based on the result of the comparison. The input/output part may be arranged between the device and the device maintenance apparatus. The input/output part may communicatively connect the device with the device maintenance apparatus.

A device maintenance method may include: controlling a communication with a device; acquiring device information of the device via the communication; storing maintenance process information, the maintenance process information including device specifying information for specifying a maintenance target device and process specifying information for specifying details of a maintenance process; and comparing the acquired device information to the stored maintenance process information, to execute a maintenance process on the device based on the result of the comparison.

A device maintenance program including computer readable instructions, which when loaded and run in a processor of an apparatus, causes the processor to perform: controlling a communication with a device; acquiring device information of the device via the communication; storing maintenance process information, the maintenance process information including device specifying information for specifying a maintenance target device and process specifying information for specifying details of a maintenance process; and comparing the acquired device information to the stored maintenance process information, to execute a maintenance process on the device based on the result of the comparison.

A non-transitory computer-readable storage medium storing a computer program, which when executed by a processor of an apparatus, causes the apparatus to perform: controlling a communication with a device; acquiring device information of the device via the communication; storing maintenance process information, the maintenance process information including device specifying information for specifying a maintenance target device and process specifying information for specifying details of a maintenance process; and comparing the acquired device information to the stored maintenance process information, to execute a maintenance process on the device based on the result of the comparison.

According to the present invention, it is possible to provide a device maintenance apparatus, a device maintenance system, a device maintenance method, a device maintenance program, and a storage medium which can improve work efficiency and reduce human errors in device processing.

BRIEF DESCRIPTION OF THE DRAWINGS

FIG. 5 is a table showing an example of an I/O list according to an embodiment.

FIG. 9 is a diagram showing an example of a display screen on which a maintenance target device is designated according to the embodiment.

FIG. 10 is a diagram showing an example of a display screen on which a module characteristic of a maintenance target device is designated according to the embodiment.

FIG. 11 is a diagram showing an example of a display screen of a notification setting according to the embodiment.

FIG. 12 is a diagram showing an example of a display screen on which an acquisition range of device information and a range of maintenance targets are set according to the embodiment.

DETAILED DESCRIPTION OF THE INVENTION

Hereinafter, a device maintenance apparatus, a device maintenance system, a device maintenance method, and a storage medium according to an embodiment of the present invention will be described with reference to the drawings.

Figure 1:
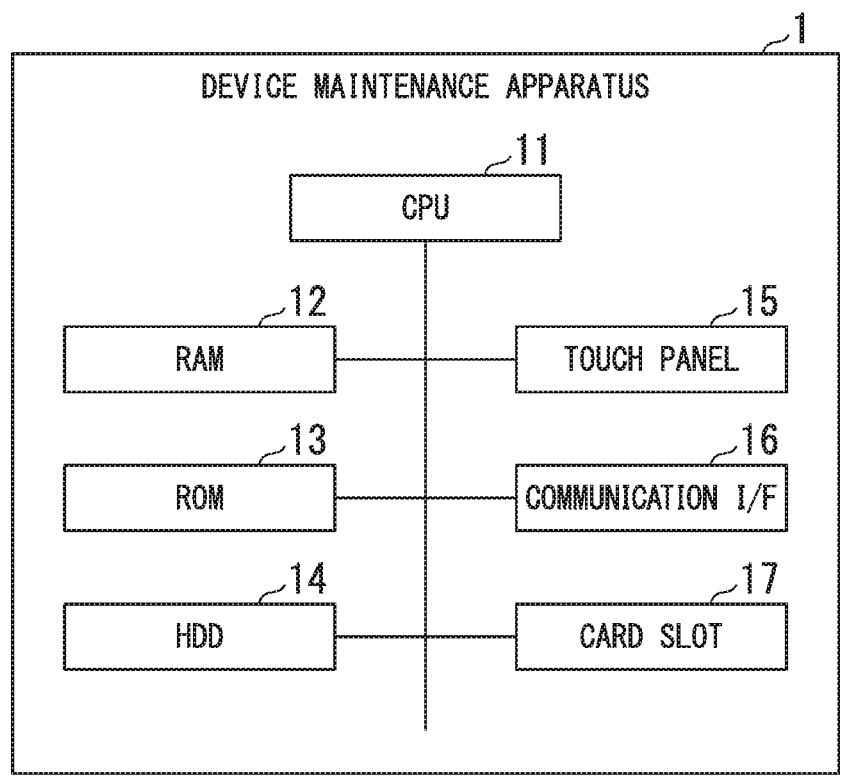
FIG. 1 is a block diagram showing an example of a hardware configuration of a device maintenance apparatus according to an embodiment.

First, the hardware configuration of a device maintenance apparatus will be described with reference to FIG. 1. FIG. 1 is a block diagram showing an example of hardware configurations of a device maintenance apparatus 1 according to the embodiment.

In FIG. 1, the device maintenance apparatus 1 includes a CPU (Central Processing Unit) 11, a RAM (Random Access Memory) 12, a ROM (Read Only Memory) 13, an HDD (Hard Disk Drive) 14, a touch panel 15, a communication I/F (Interface) 16, and a card slot 17. The device maintenance apparatus 1 is communicatively connected to a field device 2.

The device maintenance apparatus 1 includes a general-purpose apparatus such as a laptop computer, a tablet computer, a PDA, or a smart phone, and a dedicated apparatus for maintaining a device. The device maintenance apparatus 1 includes a device maintenance program for maintaining a field device, and executes the device maintenance program to support the maintenance work for the field device. The device maintenance apparatus 1 is carried in a plant and operated by a worker performing the maintenance work.

The CPU 11 executes programs stored in the RAM 12, the ROM 13, or the HDD 14 to control the device maintenance apparatus 1. The device maintenance program is obtained from a storage medium storing the device maintenance program, a server for providing the device maintenance program via a network, or the like, installed into the HDD 14, and stored in the RAM 12. The device maintenance program stored in the RAM 12 is readable by the CPU 11.

The touch panel 15 has an operation and display function including an operation input function and a display function. The touch panel 15 displays a maintenance list in which maintenance information related to the maintenance of the filed device and work targets including maintenance items for the targeted device are listed. In addition, the touch panel 15 enables the worker to perform operation input using fingertips, a touch pen, or the like. In the present embodiment, a case will be described in which the device maintenance apparatus 1 includes the touch panel 15 having the operation and display function, but the device maintenance apparatus 1 may include a display having a display function and an operation input apparatus having an operation input function. In this case, the present embodiment can be implemented using the display page of the display instead of the touch panel 15 and using the input to the operation input apparatus instead of the touch panel 15. The touch panel 15 may be implemented in various types, such as a display in a head-mount type, a glasses type, a watch type, or the like.

The communication I/F 16 controls the communication with the field device 2 or other apparatuses using wire communication or wireless communication. The communication I/F 16 includes, for example, a network adaptor. The other apparatuses include, for example, another device maintenance apparatus, a maintenance information management server for managing maintenance information, a DCS (Distributed Control System) control apparatus, an FA (Factory Automation) computer, and a PLC (Programmable Logic Controller), which are not shown.

The communication I/F 16 controls the communication with the field device 2 using a communication protocol adaptable to the field device 2. Various communication protocols are used for various field devices 2 used in the plant. Therefore, the communication I/F 16 controls the communication with each of the field devices 2 using a communication protocol adaptable to each of the field devices 2. For example, the communication I/F 16 controls the communication with the field device 2 using ISA100, which is a wireless communication standard of an ISA (International Society of Automation). The communication I/F 16 may control the communication with the field device 2 using a dedicated communication protocol for industrial instruments, such as HART (Highway Addressable Remote Transducer) (registered trademark), BRAIN (registered trademark), FOUNDATION Fieldbus, or PROFIBUS. The communication I/F 16 may control the communication with the field device 2 or the DCS using a general-purpose communication protocol, such as wireless LAN communication, wired LAN communication, infrared communication, or near field wireless communication.

The communication I/F 16 can control communication with an I/O apparatus which will be described below using FIG. 2. The communication I/F 16 is connected to field devices to communicate therewith via communication with the I/O apparatus.

The card slot 17 receives the insertion of a PC card. The card slot 17 makes available the function of the inserted PC card in the device maintenance apparatus 1. The PC card can provide, for example, a communication function for implementing specific communication or a storage function.

The field device communicatively connected to the device maintenance apparatus 1 includes a device for inputting signals indicating physical quantity (pressure, temperature, or the like) into the device maintenance apparatus 1, for example, a differential pressure gauge, a thermometer, or a flowmeter, and a device for receiving, from the device maintenance apparatus 1, control signals used to change an opening amount of an adjusting valve, for example, a adjusting valve. In FIG. 1, the figure is simplified and only one field device is shown. However, as described above, various field devices may be used in the plant and the device maintenance apparatus 1 may be connected to a plurality of field devices.

This ends the description of the hardware configuration of the device maintenance apparatus 1 with reference to FIG. 1.

Next, the functional configuration of the device maintenance apparatus will be described. FIG. 2 is a block diagram showing an example of a hardware configuration of a device maintenance system according to an embodiment.

Figure 2:
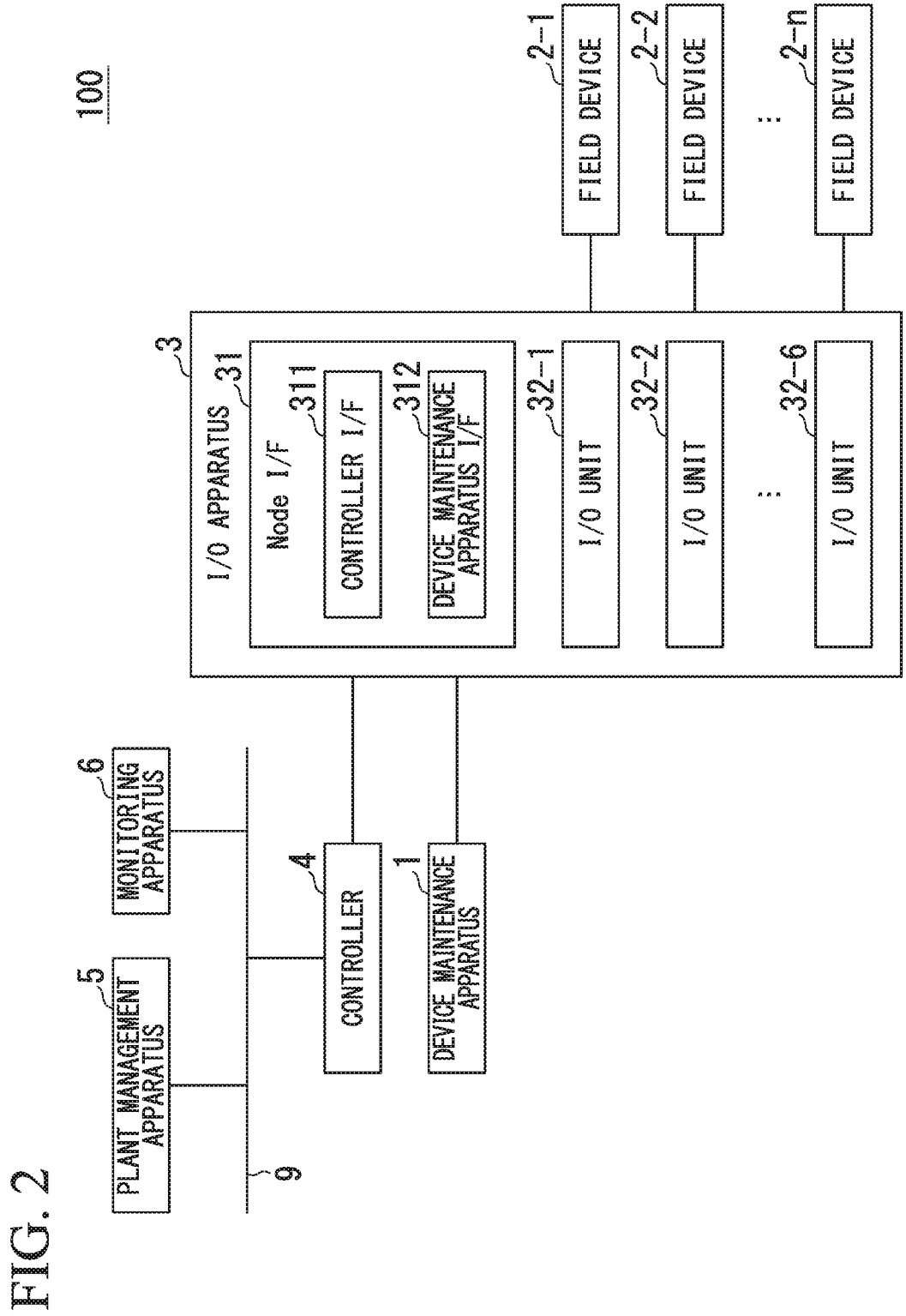
FIG. 2 is a block diagram showing an example of a hardware configuration of a device maintenance system according to the embodiment.

In FIG. 2, the device maintenance system 100 has a device maintenance apparatus 1 and an I/O apparatus 3 (input/output apparatus). The device maintenance apparatus 1 can be connected to the I/O apparatus 3. The I/O apparatus 3 is connected to a network 9 via a controller (a control apparatus) 4. The controller 4, a plant management apparatus 5, and a monitoring apparatus 6 are connected to the network 9. The I/O apparatus 3 is connected to a plurality of field devices 2-1 to 2-n that are installed in a plant. Note that the field devices 2-1 to 2-n will be referred to as field devices 2 in the description below as long as the devices are not distinguished from each other.

The plant management apparatus 5 is, for example, a DCS control apparatus that manages production of the plant. The monitoring apparatus 6 is an operation monitoring terminal that instructs the controller 4 to run the plant and monitors running states of the plant through the controller 4. The controller 4 is, for example, a PLC that controls the plant on the basis of instructions from the monitoring apparatus 6. The controller 4 acquires device information from the field devices 2 via the I/O apparatus 3 and controls the plant by outputting operation instructions to the field devices 2 via the I/O apparatus 3.

The I/O apparatus 3 has a Node I/F 31 and I/O units 32-1 to 32-6. The Node I/F 31 has a controller I/F 311 and a device maintenance apparatus I/F 312. Note that the I/O units 32-1 to 32-6 will be referred to as I/O units 32 in the description below as long as the I/O units are not distinguished from each other. The numbers 1 to 6 affixed to "-" in the I/O units 32-1 to 32-6 represent unit numbers. Each of the I/O units 32-1 to 32-6 has slots to which a plurality of I/O modules, which will be described in FIG. 3, can be connected.

Here, the I/O apparatus 3 has the device maintenance apparatus I/F 312 as a first input/output section for connecting the device maintenance apparatus 1 thereto. In addition, the I/O apparatus 3 has the I/O units 32 as a second input/output section for connecting the field devices 2 thereto. The I/O apparatus 3 is interposed between the device maintenance apparatus 1 and the field devices 2 and connects the device maintenance apparatus 1 and the field devices 2 so that the device maintenance apparatus 1 and the field devices 2 communicate with each other using the device maintenance apparatus I/F 312 and the I/O units 32.

The Node I/F 31 is an I/F which enables the device maintenance apparatus 1 and the controller 4 to communicate with the I/O modules having a plurality of communication specifications (I/O module types) that are connected to the I/O units 32. The Node I/F 31 has the controller I/F 311 for connecting to the controller 4 and the device maintenance apparatus I/F 312 for connecting to the device maintenance apparatus 1. Note that the controller I/F 311 and the device maintenance apparatus I/F 312 may be connected to the controller 4 of the device maintenance apparatus 1 on the basis of a connection through wired communication and a connection through wireless communication using radio signals. The device maintenance apparatus 1 and the controller 4 control communication in accordance with communication specifications of the I/O modules that are connected to the I/O units 32 and specifications acquired from the Node I/F 31. Note that, although the case in which the I/O apparatus 3 uses the Node I/F 31 to deal with the plurality of communication specifications of the I/O modules is exemplified in the present embodiment, when there is a single communication specification of the I/O modules, the I/O apparatus 3 may cause the controller I/F 311 and the device maintenance apparatus I/F 312 to communicate with the I/O modules without using the Node I/F 31.

The I/O apparatus 3 is illustrated such that 6 I/O units 32 including the I/O units 32-1 to 32-6 are connected. Each of the I/O units 32 has slots to which a plurality of I/O modules are connected.

This is the end of the description of the hardware configuration of the device maintenance system 100 using FIG. 2.

Next, a hardware configuration of the I/O unit 32 described in FIG. 2 will be described using FIG. 3. FIG. 3 is a block diagram showing an example of a hardware configuration of the I/O unit 32 according to the embodiment.

Figure 3A:
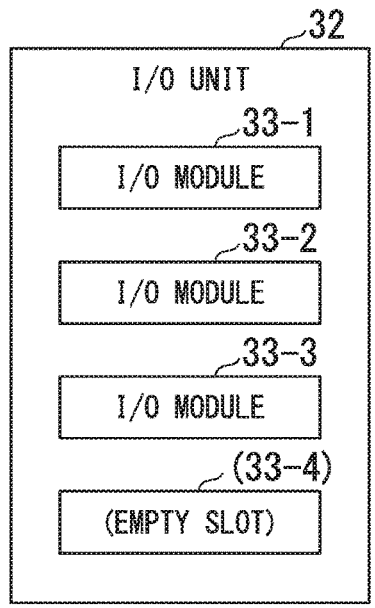
FIG. 3A is a block diagram showing an example of a hardware configuration of an I/O unit according to the embodiment.

In FIG. 3A, the I/O unit 32 is connected to I/O modules 33-1 to 33-3. The I/O modules 33-1 to 33-3 will be described as I/O modules 33 when they are not distinguished from each other in the following description. Each of the I/O units 32 has slots into which 4 of the I/O modules 33 can be connected. Reference numeral "33-4" indicates an empty slot into which none of the I/O modules 33 is connected. The numbers 1 to 4 affixed to "-" in the I/O modules 33-1 to 33-4 represent slot numbers.

Figure 3B:
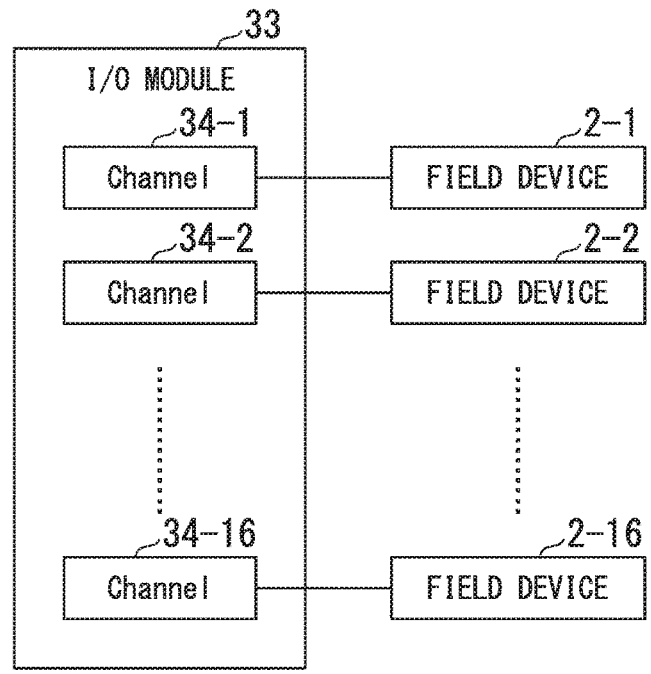
FIG. 3B is a block diagram showing an example of a hardware configuration of an I/O unit according to the embodiment.

In FIG. 3B, the I/O module 33 has channels 34-1 to 34-16. In the description below, the channels 34-1 to 34-16 will be described as channels 34 when they are not distinguished from each other. The I/O module 33 represents a case in which there are 16 channels 34. The numbers 1 to 16 affixed to "-" in the channels 34-1 to 34-16 represent channel numbers. In FIG. 3B, each channel of the channels 34-1 to 34-16 is connected to one field device among field devices 2-1 to 2-16. Thus, it is possible to specify a constant field device 2 by specifying a unit number, a module number, and a channel number. Note that, when the plurality of field device are connected to one channel using a communication protocol with which the plurality of field devices are serially connectable, identification information is further used in the serial connection to specify a constant field device 2.

With respect to the I/O module 33, for example, there are a module type in which a communication means such as one modem is provided for the channels 34-1 to 34-16 (referred to as a "serial type") and a module type in which a communication means such as one modem is provided for each of the channels 34-1 to 34-16 (a "parallel type"). The device maintenance apparatus 1 and the controller 4 which control the communication with the I/O apparatus 3 perform communication in accordance with their own module types.

The parallel type I/O modules 33 according to the present embodiment are electrically connected to the plurality of field devices (2-1, 2-2, . . . , and 2-n), and may have a plurality of universal circuits (not illustrated) that can perform an input process, an input/output process, or an output process in which at least two operations of an input of an analog signal from the field devices 2, an output of an analog signal to the field devices 2, an input of a digital signal from the field devices 2, and an output of a digital signal to the field devices 2 are combined as one set. By using the parallel type I/O modules 33 having the plurality of universal circuits, it is possible to connect a plurality of kinds of the field devices 2 to the plurality of channels of one universal I/O module, and thus to slash equipment costs and reduce a construction period in comparison to the case in which I/O circuits corresponding to types of the field devices 2 are provided to each of the channels.

Note that the I/O apparatus 3 has a terminal to which the device maintenance apparatus 1 is connected and terminals to which the field device 2 are connected, and may serve as a terminal box (a junction box) which connects the terminals.

This is the end of the description of the hardware configuration of the I/O unit 32 using FIG. 3.

Next, a functional configuration of the device maintenance apparatus 1 will be described using FIG. 4. FIG. 4 is a block diagram showing an example of a functional configuration of the device maintenance apparatus 1 according to the embodiment.

Figure 4A:
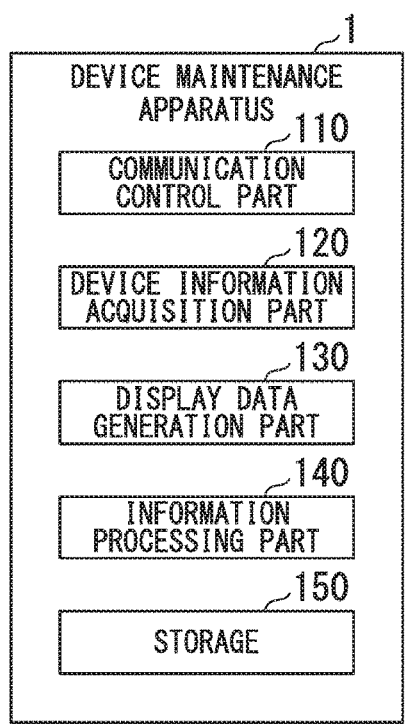
FIG. 4A is a block diagram showing an example of a functional configuration of the device maintenance apparatus according to the embodiment.

In FIG. 4A, the device maintenance apparatus 1 has functions of a communication control part 110, a device information acquisition part 120, a display data generation part 130, an information processing part 140, and a storage 150. The above-mentioned functions of the device maintenance apparatus 1 can be implemented by executing a program in the CPU 11 shown in FIG. 1. In other words, the above-mentioned functions of the device maintenance apparatus 1 are function modules implemented by software.

The communication control part 110 controls communication with the field devices 2 or communication with other devices via the communication I/F 16. The communication control part 110 performs communication control corresponding to a module type of the I/O modules 33 when the communication I/F 16 is connected to the device maintenance apparatus I/F 312 of FIG. 2. For example, when the module type of the I/O modules 33 is a serial type, the communication control part 110 performs communication control such that maintenance processes are successively executed for the channels 34 of the I/O modules 33. On the other hand, when the module type of the I/O modules 33 is a parallel type, the communication control part 110 performs communication control such that maintenance processes are executed in parallel for the channels 34 of the I/O module 33.

The communication control part 110, for example, sets a parameter of the field devices 2 reads the parameter, and confirms the parameter according to a communication class (a communication standard) controlled by a communication part 101, like a communication class such as ISA100, HART, or BRAIN. The communication control part 110 may perform control of wireless LAN communication, wired LAN communication, infrared communication, near-field wireless communication, and the like. The communication control part 110 may have a program module for communication control corresponding to each type of communication. The communication control part 110 may be capable of additionally installing a program module necessary for each type of communication. The communication control part 110 can automatically (or manually) recognize a field device 2 connected via the I/O apparatus 3 from the communication I/F 16 and acquire a parameter of the recognized field device 2.

The device information acquisition part 120 acquires parameters from the field devices 2 via the communication control part 110. A parameter of a field device 2 is an example of device information of the field device 2 and device information and a parameter will be considered to be synonymous in the present embodiment.

The parameter of the field device 2 is, for example, information for specifying the field device 2 such as a device tag, a device address, a manufacturer, a device ID, a device type, a model name, or a communication standard of the field device 2, a set value for deciding an operation of the field device 2, information indicating a state of the field device 2, or a measurement value measured for the field device 2. In other words, the parameter may include a fixed value such as a device ID and a variable value such as a set value or a measurement value of the field device. In addition, the parameter of the field device 2 may either be information acquired from the field device 2 or information set for or input to the device maintenance apparatus 1. The information set for or input to the device maintenance apparatus 1 can include, for example, text data such as a memo posted by an operator, image data such as a photograph (a still image) or a video (a moving image) captured by an operator, or the like.

Note that acquisition of the parameter of the field device 2 is not limited to the acquisition of information through the above-described communication. Such information may be acquired from the field device 2 in a way in which, for example, an operator visually recognizes a tag name or a model name of the field device 2 and inputs it using keys, or a name plate of the field device 2 on which a tag name or a model name is written is captured using a camera mounted in the device maintenance apparatus 1 and the tag name or the model name is recognized in the captured image.

In addition, a timing at which the parameter of the field device 2 is acquired is arbitrary. For example, the acquisition of the parameter is aperiodically performed in accordance with execution of a maintenance item of an operator. Furthermore, the acquisition of the parameter may be periodically performed with an interval (a frequency) pre-decided in accordance with a type of the field device 2 such as a class or a communication class of the field device 2.

The display data generation part 130 generates display data (a display screen) displayed on a touch panel 15. In the present embodiment, the display data generation part 130 generates a display screen to be described using FIG. 5 and the like. The display data generation part 130 generates the display screen on the basis of, for example, information acquired by the device information acquisition part 120, information processed by the information processing part 140, information stored in the storage 150, and the like. The display data generation part 130 can output information input from the display screen to the information processing part 140 or store the information in the storage 150.

The information processing part 140 executes processes on information in the device maintenance apparatus 1. In the present embodiment, the information processing part 140 executes, for example, a process of the device maintenance apparatus 1 to be described using the flowchart of FIG. 6. The information processing part 140 may output a result of processing of information to the display data generation part 130 or store the result in the storage 150.

The storage 150 stores information to be used by the device maintenance apparatus 1 and information to be output from device maintenance apparatus 1. Information stored in the storage 150 in the present embodiment will be described using FIG. 4B.

Figure 4B:
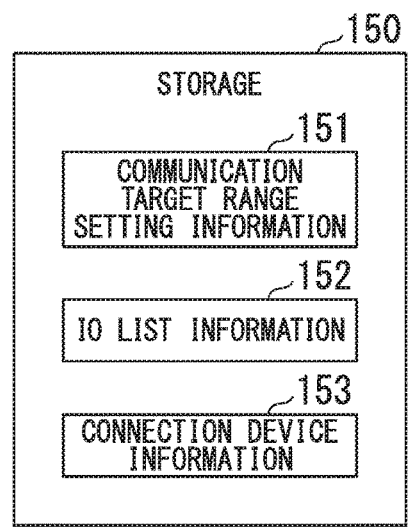
FIG. 4B is a block diagram showing an example of a functional configuration of the device maintenance apparatus according to the embodiment.

In FIG. 4B, the storage 150 stores information including communication target range setting information 151, I/O list information 152, and connected device information 153. The communication target range setting information 151 is information for setting a range of field devices (targets) with which the device maintenance apparatus 1 communicates.

The communication target range setting information 151 is set in advance and stored in the storage 150. For example, when there are many field devices with which the device maintenance apparatus 1 can communicate, it takes a long period of time to execute a maintenance process if the maintenance process is performed for all of the communicable field device 2. In addition, a range of a maintenance process may be decided in advance by an operator. A work time can be reduced by limiting a range of field devices with which the device maintenance apparatus 1 communicates using the communication target range setting information 151. The maintenance process can include, for example, a loop test (loop testing), a zero point adjustment, a span adjustment, a one-touch report, a display of detailed diagnostic information, a tag/address/role setting, a setting/cancellation of limitation on a setting, installation of a device type manager (DTM), installation of a device description (DD), an acquisition of a parameter, a calibration of a valve, squawking of a device, provisioning of ISA100, switching between on-service/off-service of a device, switching of a service mode, a partial stroke test (a partial operation inspection) of a valve, or the like. The communication target range setting information 151 may set a communication target range for each maintenance process. Note that a setting example of the communication target range setting information 151 will be described with reference to FIG. 8.

The I/O list information 152 has information for specifying a field device 2 on which a maintenance process is to be executed and information for specifying details of the maintenance process to be executed on the specified field device 2. Details of the I/O list information 152 will be described using FIG. 5.

The connected device information 153 is device information acquired by the device information acquisition part 120 from the connected field device 2. The device information acquisition part 120 acquires device information with respect to the field device 2 included in a target range set in the communication target range setting information 151 and causes the device information to be stored in the storage 150 as the connected device information 153.

The storage 150 may store information other than the above-described information. For example, the storage 150 may store a result of a maintenance process and a plan of a maintenance process pre-decided for each of the field devices 2.

Note that the case in which the functions of the communication control part 110, the device information acquisition part 120, the display data generation part 130, the information processing part 140, and the storage 150 included in the device maintenance apparatus 1 are implemented by software has been described in FIG. 4. However, one or more of the above-described functions of the device maintenance apparatus 1 may be implemented by hardware. In addition, each of the functions of the device maintenance apparatus 1 may be divided into a plurality of functions and executed. Furthermore, two or more of the functions of the device maintenance apparatus 1 may be combined into one function and executed.

This is the end of the description of the functional configuration of the device maintenance apparatus using FIG. 4.

Next, details of the I/O list information 152 stored in the storage 150 will be described using FIG. 5. FIG. 5 is a table showing an example of an I/O list according to the embodiment.

In FIG. 5, the I/O list 1000 displays a display screen generated by the display data generation part 130 on the basis of the I/O list information 152 stored in the storage 150. The I/O list 1000 has items including device tag 1001, a device type 1002, a manufacturer ID 1003, a unit number 1004, a slot number 1005, a channel number 1006, a device ID 1007, a protocol 1008, a device tag 1009, a descriptor 1010, a lower limit value 1011, an upper limit value 1012, and a unit 1013. Each record on the I/O list 1000 corresponds to each field device.

In FIG. 5, the device tag 1001, the unit number 1004, the slot number 1005, and the channel number 1006 of the I/O list 1000 is given a symbol "C" as information for specifying a maintenance process target. The information for specifying a maintenance process target can be arbitrarily selected when the I/O list 1000 is generated or edited. In FIG. 5, matching of the I/O list with a field device can be confirmed by comparing the items which are comparison items to device information acquired by the device information acquisition part 120. Note that the device tag 1001 is information for specifying a constant field device. In addition, the unit number 1004, the slot number 1005, and the channel number 1006 are also information for specifying the constant field device described with reference to FIGS. 2 and 3. In other words, in FIG. 5, the device tag 1001 specifies a field device as well as whether a physical position of the I/O apparatus connected to the field device is correct is set as a matching condition. Thus, even if device tags are the same, they are determined not to match when connection positions specified by the unit number 1004, the slot number 1005, and the channel number 1006 of the connected I/O apparatus are different. Note that, when the I/O apparatus 3 is a terminal box (a junction box), no unit number, slot number, and channel number may be given thereto, and it may be possible to specify a field device by only the device tag 1001.

In addition, the I/O list 1000 includes process specifying information for specifying details of a maintenance process to be executed on a field device that is a maintenance target. The setting of the device information with respect to a field device shown in FIG. 5 is an example of a maintenance process specified by process specifying information. In FIG. 5, the symbol "D" given to the items including the device tag 1009, the descriptor 1010, the lower limit value 1011, the upper limit value 1012, and the unit 1013 of the I/O list 1000 is for specifying device information of a field device. In other words, the I/O list 1000 shows that the device information specified with the symbol "D" is set for the device that is a maintenance target specified with the symbol "C."

Information for specifying device information can also be arbitrarily selected when the I/O list 1000 is generated or edited. Note that a device tag is used as information for specifying a field device in the device tag 1001 and is used as device information set for a maintenance process in the device tag 1009. The I/O list enables the device information to be used for specifying a field device or used as set device information, thereby making the maintenance process flexible.

This is the end of the description of details of the I/O list information 152 using FIG. 5.

Figure 6:
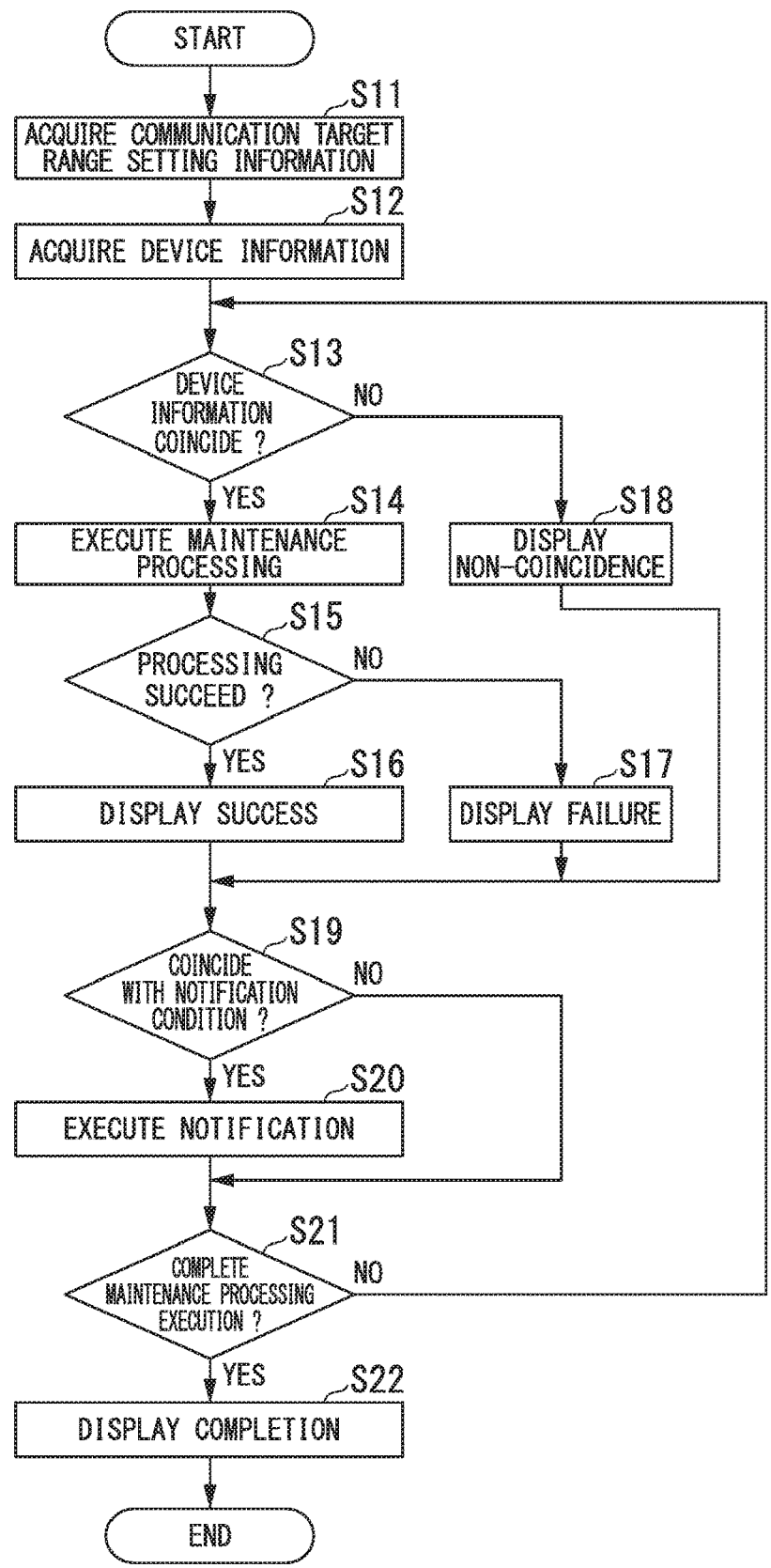
FIG. 6 is a flowchart showing an example of an operation of the device maintenance apparatus according to the embodiment.

Next, an operation of the device maintenance apparatus 1 will be described using FIG. 6. FIG. 6 is a flowchart showing an example of an operation of the device maintenance apparatus according to the embodiment. Note that the process of the flowchart of FIG. 6 will be described as being executed in the device maintenance apparatus 1.

In FIG. 6, the device maintenance apparatus 1 acquires the communication target range setting information 151 in which a communication range for the field devices 2 is set from the storage 150 (Step S11). After the process of Step S11 is executed, the device maintenance apparatus 1 acquires device information of a connected field device 2 in the communication range set in the communication target range setting information 151 (Step S12).

The device maintenance apparatus 1 causes the acquired device information to be stored in the storage 150 as the connected device information 153.

After the process of Step S12 is executed, the device maintenance apparatus 1 compares information for specifying a maintenance process target (device information set with the symbol "C") set in the I/O list information 152, which is stored in the storage 150 in advance to be readable by the device maintenance apparatus 1, to the connected device information 153 and determines whether the pieces of the information match (Step S13). When the pieces of the information are determined to match (Yes in Step S13), the device maintenance apparatus 1 executes a maintenance process of setting device information specified in the I/O list information 152 for the field device 2 and the like (Step S14).

Note that a process of storing the I/O list information 152 compared in the process of Step S13 to be readable by the device maintenance apparatus 1 may be executed before the process of Step S13 is executed. The process of the flowchart shown in FIG. 6 and the process of storing the I/O list information 152 can be asynchronously performed. When the process of Step S13 is executed, a process of storing maintenance process information, which is not illustrated, is assumed to be executed in advance.

After the process of Step S14 is executed, the device maintenance apparatus 1 determines whether the executed maintenance process succeeded (Step S15). The determination of whether the maintenance process succeeded can be made by, for example, acquiring a response signal of a setting success from the field device 2 or the like. When the maintenance process is determined to have succeeded (Yes in Step S15), the device maintenance apparatus 1 displays the success (Step S16). On the other hand, when the maintenance process is determined not to have succeeded (No in Step S15), the device maintenance apparatus 1 displays the failure (Step S17).

On the other hand, when the pieces of the information are determined not to match in the process of Step S13 (No in Step S13), the device maintenance apparatus 1 displays the mismatch (Step S18). After the process of Step S16, Step S17, or Step S18 is executed, the device maintenance apparatus 1 determines whether the result of the process satisfies a notification condition (Step S19). The notification condition refers to a condition for determining whether a condition pre-set in the maintenance process is satisfied. For example, when the failure is displayed in the process of Step S17, the display of the mismatch in the process of Step S18 may serve as a notification condition. Note that details of the notification condition may be arbitrarily set.

When the result of the process is determined to satisfy the notification condition (Yes in Step S19), the device maintenance apparatus 1 execute notification (Step S20). Details of the notification can be set in advance. An output of an alert sound from a speaker of the device maintenance apparatus 1, which is not illustrated, or the like to give a notification, for example, of a transmission of an email to a pre-set email address, may be performed. Through the execution of the notification, generation of the notification condition may be reported to an operator.

After the process of Step S20 is executed or when the result is determined not to match the notification condition (No in Step S19), the device maintenance apparatus 1 determines whether the maintenance process has been completed (Step S21). The determination of whether the maintenance process has been completed can be made by determining whether the maintenance process for the field device within the communication range set in the communication target range setting information 151 acquired in Step S11 has been completed. When the maintenance process is determined to have been completed (Yes in Step S21), the device maintenance apparatus 1 performs a display of the completion (Step S22), and thereby the operation of the flowchart shown in FIG. 6 is finished. On the other hand, when the maintenance process is determined not to have been completed (No in Step S21), the device maintenance apparatus 1 returns to the process of Step S13, and determines matching of device information of a field device 2 that is the next maintenance target.

Note that, although a serial process in which the maintenance process is executed for each field device has been exemplified in FIG. 6, the processes of Step S12 to Step S22 may be executed in a parallel process. In other words, when a module type of the I/O modules 33 is a parallel type, the device maintenance apparatus 1 may execute maintenance processes for the each of the channels 34 of the I/O modules 33 in parallel.

In addition, in the process of Step S14, the device maintenance apparatus I/F 312 of the I/O apparatus 3 may transmit a request for setting or adjusting (hereinafter referred to as a "setting/adjusting request") with respect to channels of the I/O modules 33 on the basis of, for example, addressee information or identification information for identifying a transmission destination such as a device tag set in advance in a request for a setting or adjusting for a maintenance process received from the device maintenance apparatus 1. When a frame of the setting/adjusting request issued by the device maintenance apparatus 1 includes addressee information indicating to which channel of which I/O module the request has been made, the device maintenance apparatus I/F 312 of the I/O apparatus 3 can decide a transmission destination of the frame of the setting/adjusting request on the basis of the addressee information included in the frame.

This is the end of the description of the operation of the device maintenance apparatus 1 using FIG. 6.

Figure 7:
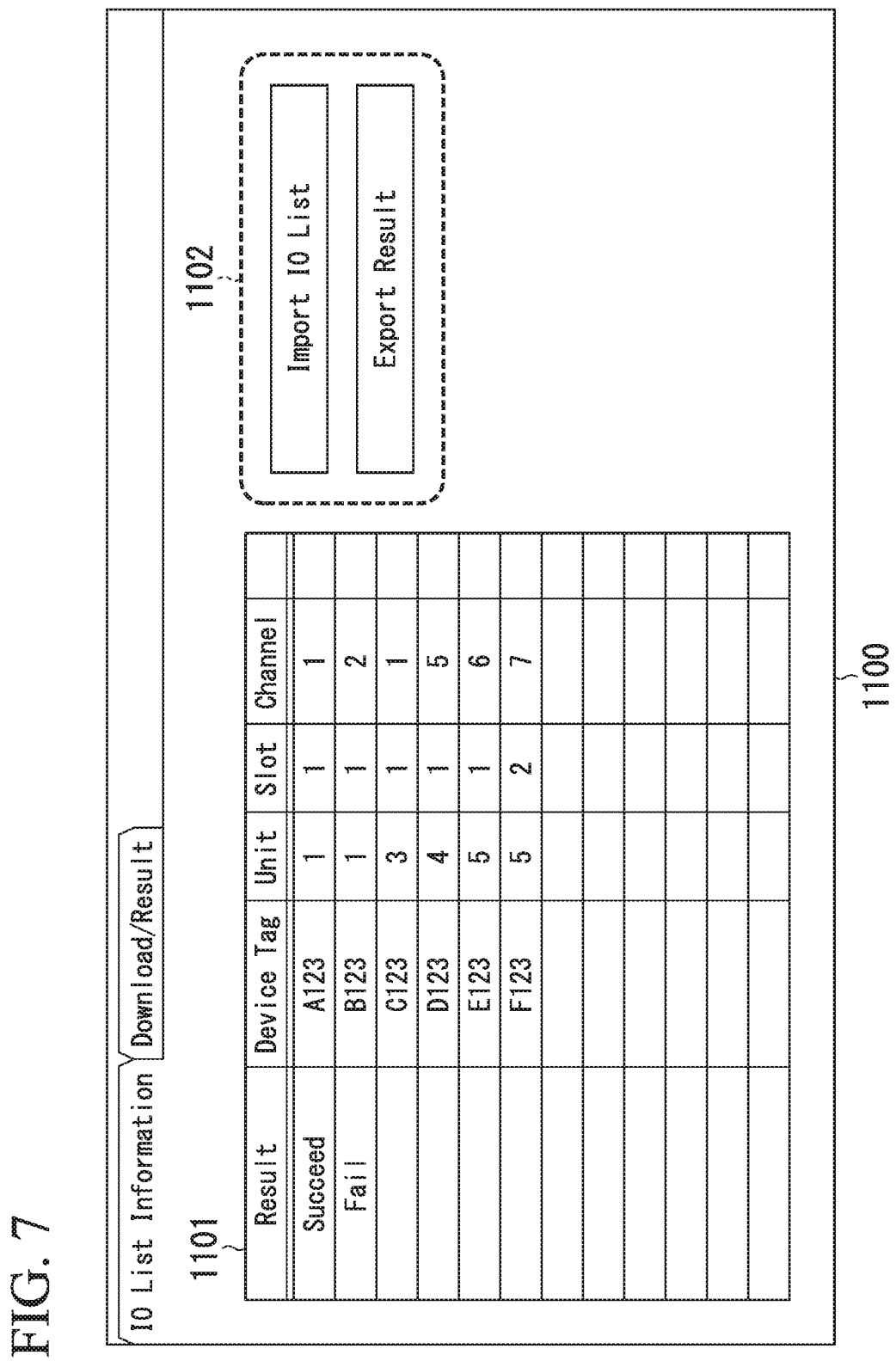
FIG. 7 is a diagram showing an example of a display screen of the I/O list according to the embodiment.

Next, a display screen of an I/O list will be described using FIG. 7. FIG. 7 is a diagram showing an example of a display screen of an I/O list according to the embodiment.

In FIG. 7, an I/O list display screen 1100 has a result display section 1101 and buttons 1102. The I/O list display screen 1100 shows a display result when "Import I/O List" among the buttons 1102 is depressed. The result display section 1101 shows a process result of the previous maintenance process. An operator may specify, for example, a field device 2 for which the result display section 1101 is "Fail" as a maintenance target. Note that an upper part of the I/O list display screen 1100 includes a button for switching into a display screen on which a maintenance process is executed to be described in FIG. 8.

This is the end of the description of the display screen of the I/O list using FIG. 7.

Figure 8:
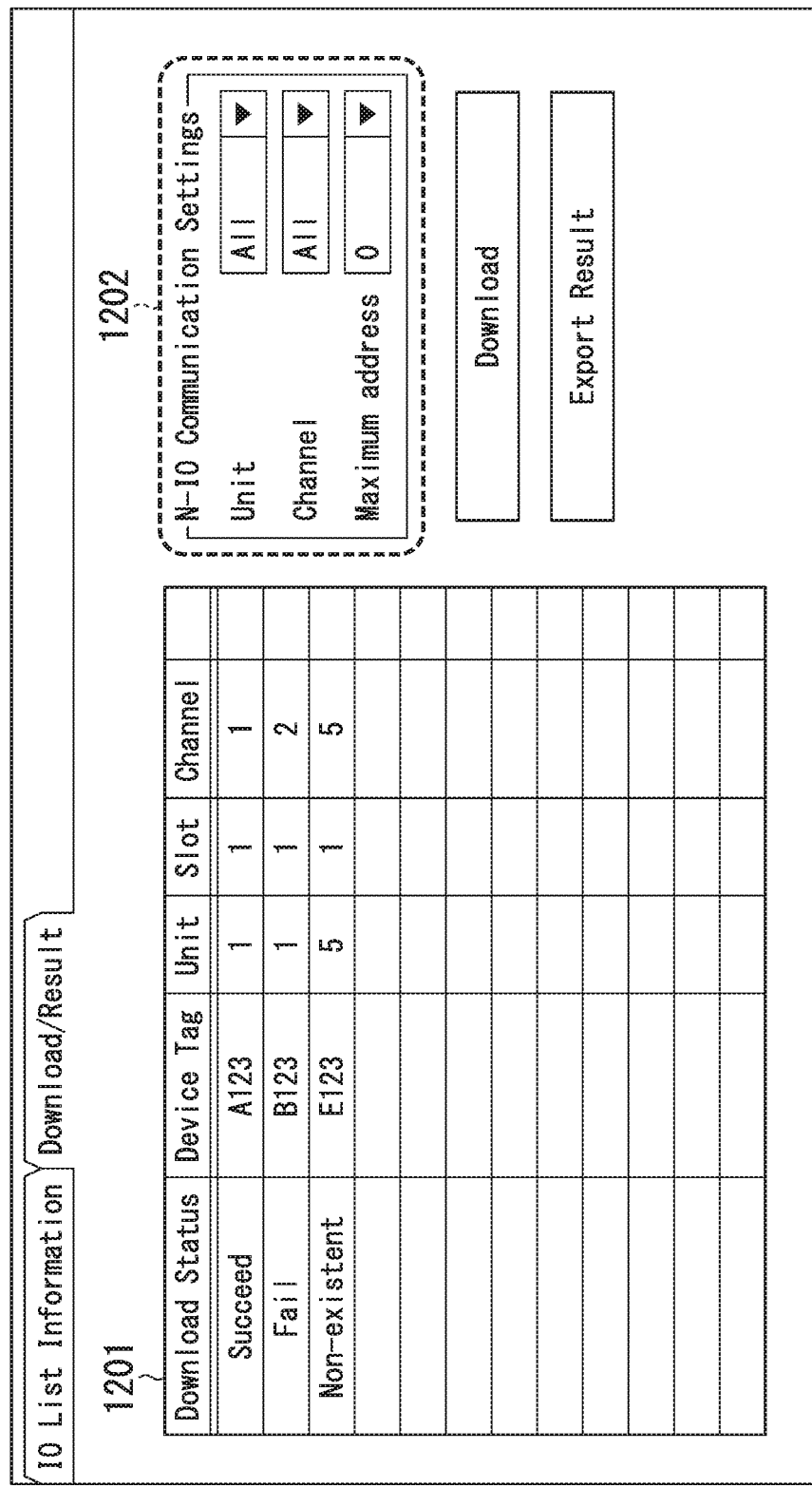
FIG. 8 is a diagram showing an example of a display screen on which a maintenance process is executed according to the embodiment.

Next, a display screen on which a maintenance process is executed will be described using FIG. 8. FIG. 8 is a diagram showing an example of the display screen on which a maintenance process is executed according to the embodiment.

In FIG. 8, a maintenance process execution screen 1200 has a result display section 1201 and a communication target range setting section 1202. The communication target range setting section 1202 is a display screen for setting communication target range setting information. A case in which a unit number, a channel number, and maximum addresses are set in the communication target range setting section 1202 is illustrated. The maximum addresses are for setting the maximum number of connections in serial connection when a plurality of field devices are connected to one channel among the channels 34 using a communication protocol in which the plurality of field device can be serially connected. The maintenance process execution screen 1200 shows a display screen when a "Download" button is pressed. In the result display section 1201, a success display (Succeed), a failure display (Fail), and a mismatch display (Non-existent) that are results of the maintenance process are displayed.

This is the end of the description of the display screen on which the maintenance process is executed using FIG. 8.

Next, a display screen on which a maintenance target device is designated will be described using FIG. 9. FIG. 9 is a diagram showing an example of a display screen on which a maintenance target device is designated according to the embodiment.

In FIG. 9, a maintenance target designation screen 1300 has a communication designation section 1301. An operator sets "TRUE" in the communication designation section 1301 and thus can designate a set field device as a maintenance process target. On the other hand, by setting "FALSE" in the communication designation section 1301, the set field device can be designated as a non-maintenance process target. For example, a predetermined field device on the I/O list can be designated as a non-maintenance target by arbitrarily designating a maintenance process target using the maintenance target designation screen 1300.

This is the end of the description of the display screen on which a maintenance target device is designated using FIG. 9.

Next, a display screen on which a module characteristic of a maintenance target device is designated will be described using FIG. 10. FIG. 10 is a diagram showing a display screen on which a module characteristic of a maintenance target device is designated according to the embodiment.

In FIG. 10, a module characteristic designation screen 1400 has a module type designation section 1401. An operator can perform the maintenance process for set field devices in a parallel process by setting "XXXX" in the module type designation section 1401. The operator can perform the maintenance process for set field devices in a serial process by setting "YYYY" in the module type designation section 1401. In addition, the operator can perform the maintenance process for set field devices in another process by setting "ZZZZ" in the module type designation section 1401. The other process refers to a process using, for example, a predetermined communication condition. Note that a module characteristic of the I/O modules 33 may be automatically acquired from the I/O modules 33.

This is the end of the description of the display screen on which the module characteristic of the maintenance target device is designated using FIG. 10.

Next, a display screen of a notification setting will be described using FIG. 11. FIG. 11 is a diagram showing an example of a display screen of a notification setting according to the embodiment.

In FIG. 11, the display screen for a notification setting shows an email transmission setting. The email transmission setting includes a text box into which an email address is input and check boxes for email transmission conditions. The email transmission conditions include a notification when downloading is completed, a notification when an error occurs, and a notification when a mismatch occurs. However, details of the notification setting are not limited thereto and, for example, a condition in which a plurality of conditions are combined may be set. In addition, details to be transmitted (a title, a body, or an attached file) may be set.

This is the end of the description of the display screen of the notification setting using FIG. 11.

Next, a display screen on which an acquisition range of device information and a range of maintenance targets are set will be described using FIG. 12. FIG. 12 is a diagram showing an example of a display screen on which an acquisition range of device information and a range of maintenance targets are set according to the embodiment.

In FIG. 12, a channel number of a master device is designated in a "designation of master device range." The master device is a copy source of device information. In addition, in the "designation of commissioning device range," a channel number of a commissioning device is designated. The commissioning device is a copy source of device information. Information corresponding to the I/O list can be acquired from the master device even when the I/O list is not generated in advance by setting an acquisition range of device information decided by the master device designated in the "designation of master device range" and a range of maintenance targets decided by the commissioning device designated in the "designation of commissioning device range" on the display screen.

Note that, when the module type designation section 1401 of the I/O list described in FIG. 10 is set as a parallel type, the device maintenance apparatus 1 may execute the maintenance process in parallel with the channels 34-1 to 34-16, each of which is a channel of the I/O modules 33.

The device maintenance apparatus 1 may control, for example, a timing at which setting/adjusting requests are issued and transmitted so that the setting/adjusting requests are not simultaneously issued to the same channel, set addressees of the 16 different channels of the I/O modules, simultaneously issue the setting/adjusting requests in a parallel manner, and transmit them to the I/O apparatus 3 (in an asynchronous transmission). In this case, for example, the device maintenance apparatus I/F 312 of the I/O apparatus may simultaneously transmit the setting/adjusting requests to the each of the channels of the I/O modules 33 on the basis of addressee information or identification information for identifying a transmission destination such as a device tag decided in the setting/adjusting requests in advance for a maintenance process received from the device maintenance apparatus 1.

The device maintenance apparatus 1 can make a start-up adjusting request for requesting starting up and adjusting field devices in parallel for each channel by issuing a setting/adjusting request to the channels in parallel (asynchronously), which can dramatically reduce a work time required for starting up the field devices. Specifically, for example, since the parallel type I/O modules have 16 channels and communication modems for the channels, all of the field devices are connected to the 16 channels so that, when a maintenance process of starting up and adjusting all of the connected field devices is executed, a time required for the maintenance process can be reduced to $\frac{1}{16}$ of a case in which a maintenance process is performed with I/O modules (of the serial type) that are not capable of such parallel communication.

This is the end of the description of the display screen on which an acquisition range of device information and a range of maintenance targets are set using FIG. 12.

Figure 13:
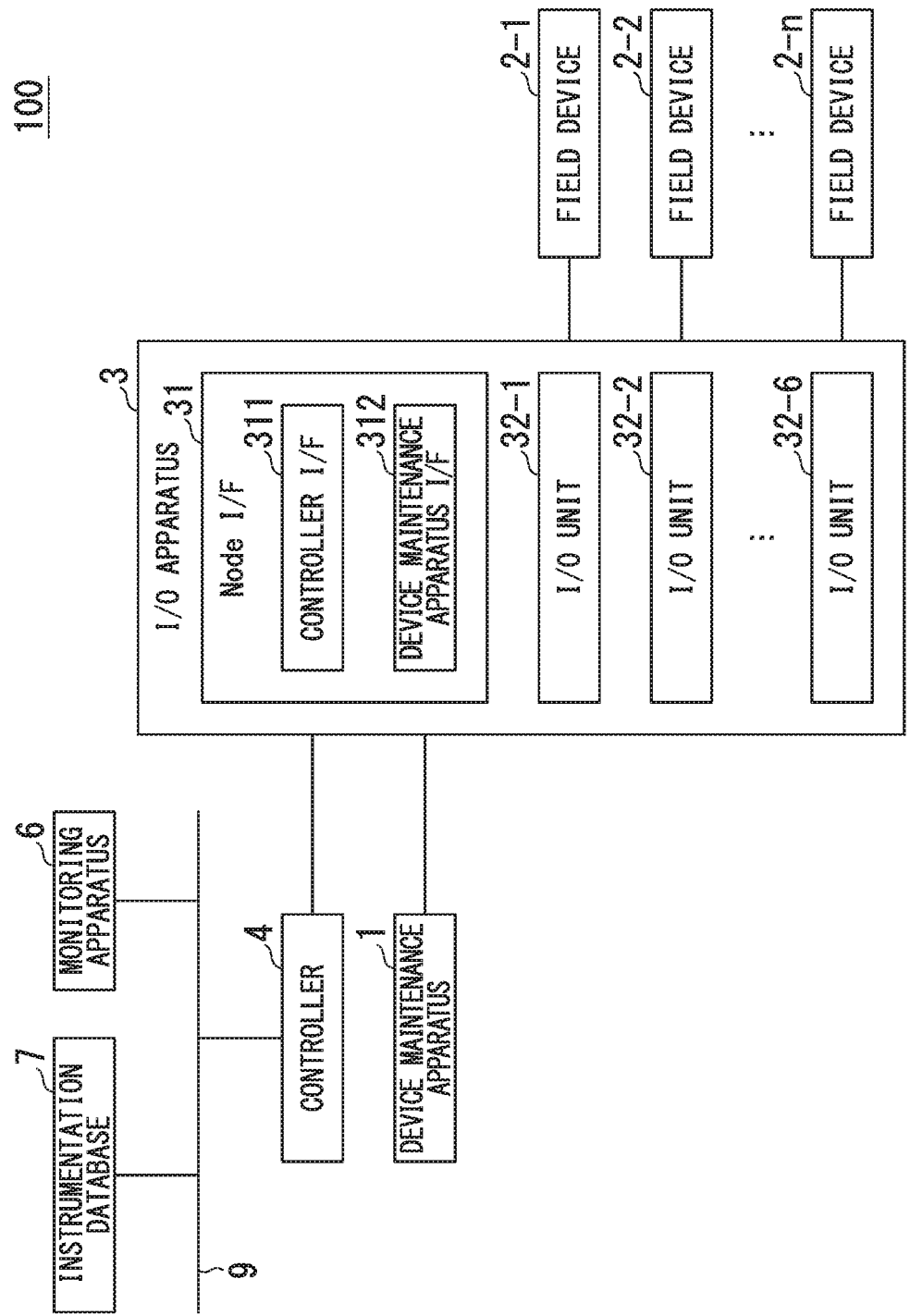
FIG. 13 is a block diagram showing another example of the hardware configuration of the device maintenance system according to the embodiment.

Next, an alternative configuration of the device maintenance system 100 described in FIG. 2 will be described using FIG. 13. FIG. 13 is a block diagram showing another example of the hardware configuration of the device maintenance system according to the embodiment. In the description of FIG. 13, parts overlapping with FIG. 2 will be omitted and description on the device maintenance system 100 will be supplemented.

In FIG. 13, the device maintenance system 100 includes the device maintenance apparatus 1, the field devices 2-1 to 2-n (the field devices 2), the I/O apparatus 3, the controller 4, the monitoring apparatus 6, and an instrumentation database 7. The device maintenance system 100 is a process control system in which control of an industrial process is implemented in a plant since the controller 4 controls the field devices 2 in accordance with an instruction from the monitoring apparatus 6 or the like.

In the process control system, the field devices 2 and the I/O apparatus 3 are connected to each other by transmission lines. In addition, the device maintenance apparatus 1, the controller 4, the monitoring apparatus 6, and the instrumentation database 7 are connected to each other via the network 9. Note that the network 9 used in the process control system is, for example, a control network that connects a work area of the plant and a monitoring room.

In addition, in the process control system, the field devices 2 are, for example, a sensor such as a flow meter or a temperature sensor, a valve such as a flow control valve or an opening/closing valve, an actuator such as a fan or a motor, and other devices installed in the work area of the plant.

Furthermore, in the process control system, the controller 4 communicates with the field devices 2 in accordance with an instruction from the monitoring apparatus 6 to control the field devices 2. Specifically, the controller 4 acquires a process value measured by a certain field device (for example, a sensor), computes an operation amount of the other field devices (for example, a valve), transmits a result of the computation to the other field devices, and thereby controls the other field devices.

The instrumentation database 7 stores design information. The design information refers to, for example, design information and the like of the plant including the process control system. The design information stored in the instrumentation database 7 can be used for information to be set in the field devices 2, the I/O apparatus 3, or the controller 4. In other words, the information to be set in field device 2, the I/O apparatus 3, or the controller 4 may be generated on the basis of the design information. The instrumentation database 7 may store an I/O list used by the above-described device maintenance apparatus 1. In other words, the instrumentation database 7 may store an I/O list created by the device maintenance apparatus 1 or other devices. The device maintenance apparatus 1 may acquire the I/O list stored in the instrumentation database 7 to perform a setting of each of the field devices 2 as described above. Note that, in this case, the device maintenance apparatus 1 may not be connected to the controller 4 to communicate therewith, and may not necessarily be connected to the I/O apparatus 3 at all times.

This is the end of the description of the alternative configuration of the device maintenance system 100 using FIG. 13.

As described above, the device maintenance apparatus according to the present embodiment includes a communication control part that controls communication with devices, a device information acquisition part that acquires device information of the devices via communication therewith, a storage that stores maintenance process information including device specifying information for specifying a maintenance target device and process specifying information for specifying details of a maintenance process, and an information processing part that compares the acquired device information to the stored maintenance process information and executes a maintenance process on a device on the basis of a result of the comparison, and thus it is possible to provide a device maintenance apparatus which can improve work efficiency and reduce human errors in device processing.

Note that, although the example of the setting of the device information for the field devices has been described as a maintenance process specified by process specifying information in the present embodiment, the maintenance process specified by the process specifying information is not limited thereto. The maintenance process specified by the process specifying information may be, for example, a loop test, a zero point adjustment, a span adjustment, a one-touch report, a display of detailed diagnostic information, tag/address/role setting, a setting/cancellation of a limitation on a setting, installation of a DTM, installation of a DD, an acquisition of a parameter, a calibration of a valve, squawking of a device, provisioning of ISA 100, switching of on-service/off-service of a device, switching of a service mode, a partial stroke test of a valve, or the like. In addition, the maintenance process specified by process specifying information may include conditions such as a maintenance execution date, a state of a plant when maintenance is executed, and a designation of an operator who will execute the maintenance.

In addition, although the case in which the I/O list 1000 exemplified as the maintenance process information is created in advance as data in a list format and stored in the storage 150 has been described in the present embodiment, a data format of the maintenance process information is not limited thereto. The maintenance process information may be, for example, a data format other than a list format, such as image data or the like. In addition, the maintenance process information may be built in a predetermined markup language. Further, the maintenance process information may be a set of a plurality of pieces of data for generating the maintenance process information. In addition, the maintenance process information may be stored in other apparatuses (in a distributed manner) instead of being stored in the storage 150 of the device maintenance apparatus 1.

The above-described various processes of the present embodiment may be implemented by recording a program for implementing functions in the apparatus described in the present embodiment into a computer readable storage medium, making a computer system read the program stored in the storage medium, and executing the program. The "computer system" may include an operating system and a hardware such as a peripheral device. If the World Wide Web is used, the "computer system" may include an environment for providing homepage (or display environment). The "computer readable storage medium" indicates a portable medium such as a flexible disk, a magnetic optical disk, a ROM, a writable non-volatile memory such as a flash memory, a CD-ROM and a storage such as a hard-disk embedded in a computer system.

In addition, the "computer readable storage medium" may include a medium for storing a program for a given length of time like a volatile memory (for example, a Dynamic Random Access Memory (DRAM)) embedded in a computer system, which is a server or client when a program is transmitted via a communication line such as a network including the Internet and a phone line. The above-described program may be transferred, from the computer system including the storage storing this program, to another computer system, via a transmission medium, or by transmission waves in the transmission medium. The "transmission medium" that transmits the program means a medium having a function to transmit information, such as a network (communication net) like the Internet, or a communication line (communication wire) like a phone line like. The above-described program may be used to implement a part of the above-described functions. In addition, the above-described program may implement the above-described functions in cooperation with another program previously stored in the computer system, so-called difference file (difference program).

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of an apparatus includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, an apparatus and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A device maintenance apparatus, comprising:
   a communication control part configured to control communication with a plurality of devices via an input/output apparatus, the input/output apparatus being connected to the plurality of devices;
   a device information acquisition part configured to acquire a plurality of pieces of device information of the plurality of devices via the communication;
   a storage configured to store maintenance process information, the maintenance process information including device specifying information for specifying a maintenance target device and process specifying information for specifying details of a maintenance process, the device specifying information and the process specifying information being set beforehand for each maintenance target device; and
   an information processing part configured to compare each of the acquired plurality of pieces of device information to the device specifying information included in the stored maintenance process information to determine whether each of the acquired plurality of pieces of device information is matched with the device specifying information, and to execute, on a device specified by the device specifying information which has been determined to be matched, a maintenance process specified by the process specifying information set for beforehand for the device.

2. The device maintenance apparatus according to claim 1, wherein the device information acquisition part acquires the device information of the device within a communication range that is capable of being set beforehand.

3. The device maintenance apparatus according to claim 1, wherein the device information acquisition part acquires the device information of the device with respect to a target that is capable of being set beforehand.

4. The device maintenance apparatus according to claim 1, wherein the information processing part executes the maintenance process on the device in a communication specification that is capable of being set beforehand.

5. The device maintenance apparatus according to claim 1, wherein, when the result of the executed maintenance process satisfies a condition that is set beforehand, the information processing part executes a notification process based on a notification method that is set beforehand.

6. A device maintenance system comprising a device maintenance apparatus and an input/output apparatus arranged between a plurality of devices and the device maintenance apparatus, the input/output apparatus communicatively connecting the device with the device maintenance apparatus, wherein the device maintenance apparatus includes:
   a communication control part configured to control communication with the plurality of devices via the input/output apparatus, the input/output apparatus being connected to the plurality of devices;
   a device information acquisition part configured to acquire a plurality of pieces of device information of the plurality of devices via the communication;
   a storage configured to store maintenance process information, the maintenance process information including device specifying information for specifying a maintenance target device and process specifying information for specifying details of a maintenance process, the device specifying information and the process specifying information being set beforehand for each maintenance target device; and
   an information processing part configured to compare each of the acquired plurality of pieces of device information to the device specifying information included in the stored maintenance process information to determine whether each of the acquired plurality of pieces of device information is matched with the device specifying information, and to execute, on a device specified by the device specifying information which has been determined to be matched, a maintenance process specified by the process specifying information set for beforehand for the device.

7. The device maintenance system according to claim 6, wherein the device information acquisition part acquires the device information of the device within a communication range that is capable of being set beforehand.

8. The device maintenance system according to claim 6, wherein the device information acquisition part acquires the device information of the device with respect to a target that is capable of being set beforehand.

9. The device maintenance system according to claim 6, wherein the information processing part executes the maintenance process on the device in a communication specification that is capable of being set beforehand.

10. The device maintenance system according to claim 6, wherein, when the result of the executed maintenance process satisfies a condition that is set beforehand, the information processing part executes a notification process based on a notification method that is set beforehand.

11. A device maintenance method, comprising:
    a communication control step of controlling communication with a plurality of devices via an input/output apparatus, the input/output apparatus being connected to the plurality of devices;
    a device information acquisition step of acquiring a plurality of pieces of device information of the plurality of devices via the communication;
    a storing step of storing maintenance process information, the maintenance process information including device specifying information for specifying a maintenance target device and process specifying information for specifying details of a maintenance process, the device specifying information and the process specifying information being set beforehand for each maintenance target device; and
    an information processing step of comparing each of the acquired plurality of pieces of device information to the device specifying information included in the stored maintenance process information to determine whether each of the acquired plurality of pieces of device information is matched with the device specifying information, and executing, on a device specified by the device specifying information which has been determined to be matched, a maintenance process specified by the process specifying information set for beforehand for the device.

12. The device maintenance method according to claim 11, wherein, in the device information acquisition step, the device information of the device within a communication range that is capable of being set beforehand is acquired.

13. The device maintenance method according to claim 11, wherein, in the device information acquisition step, the device information of the device with respect to a target that is capable of being set beforehand is acquired.

14. The device maintenance method according to claim 11, wherein, in the information processing step, the maintenance process on the device in a communication specification that is capable of being set beforehand is executed.

15. The device maintenance method according to claim 11, wherein, in the information processing step, when the result of the executed maintenance process satisfies a condition that is set beforehand, a notification process is executed based on a notification method that is set beforehand.

16. A non-transitory computer-readable storage medium storing a computer program, which when executed by a processor of an apparatus, causes the apparatus to perform:
a communication control process of controlling communication with a plurality of devices via an input/output apparatus, the input/output apparatus being connected to the plurality of devices;
a device information acquisition process of acquiring a plurality of pieces of device information of the plurality of devices via the communication;
a storing process of storing maintenance process information, the maintenance process information including device specifying information for specifying a maintenance target device and process specifying information for specifying details of a maintenance process, the device specifying information and the process specifying information being set beforehand for each maintenance target device; and
an information process of comparing each of the acquired plurality of pieces of device information to the device specifying information included in the stored maintenance process information to determine whether each of the acquired plurality of pieces of device information is matched with the device specifying information, to execute, on a device specified by the device specifying information which has been determined to be matched, a maintenance process specified by the process specifying information set for beforehand for the device.

17. The device maintenance apparatus according to claim 1, wherein
the device information acquisition part acquires first information for specifying each of the plurality of devices and second information of a connection position of each of the plurality of devices in the input/output apparatus, and
the information processing part compares the first information and the second information to the device specifying information to determine whether the first information and the second information are matched with the device specifying information, and to execute, on a device specified by the device specifying information which has been determined to be matched, a maintenance process specified by the process specifying information set for beforehand for the device.

* * * * *